United States Patent [19]

Rosenzweig et al.

[11] Patent Number: 4,686,071

[45] Date of Patent: Aug. 11, 1987

[54] TEMPERATURE INDICATION ASSEMBLY FOR USE WITH HEAT-RECOVERABLE ARTICLES

[75] Inventors: Nachum Rosenzweig, Palo Alto; Ken W. Skanderup, Belmont, both of Calif.

[73] Assignee: Raychem Corporation, Menlo Park, Calif.

[21] Appl. No.: 634,242

[22] Filed: Jul. 25, 1984

[51] Int. Cl.[4] .............................................. H05B 3/08
[52] U.S. Cl. ........................................ 264/27; 156/86; 156/273.5; 219/535; 264/36; 264/40.2; 264/104; 264/105; 264/230; 264/248
[58] Field of Search .................... 264/27, 230, 36, 248, 264/104, 40.2, 105; 156/86, 273.5; 219/535, 541

[56] References Cited

U.S. PATENT DOCUMENTS

| 3,396,460 | 8/1968 | Wetmore | 264/230 |
|---|---|---|---|
| 3,514,326 | 5/1970 | Stow | 264/104 |
| 3,567,259 | 3/1971 | Benson et al. | 264/230 |
| 3,770,556 | 11/1973 | Evans et al. | 264/230 |
| 3,847,694 | 11/1974 | Stewing | 156/86 |
| 3,975,039 | 8/1976 | Penneck et al. | 264/230 |
| 4,344,909 | 8/1982 | DeBlauwe | 264/230 |
| 4,378,323 | 3/1983 | Brandeau | 264/27 |
| 4,421,582 | 12/1983 | Horsma et al. | 264/27 |

FOREIGN PATENT DOCUMENTS 1265194 3/1972 United Kingdom .

Primary Examiner—Jeffery Thurlow
Attorney, Agent, or Firm—Timothy H. P. Richardson; Herbert G. Burkard

[57] ABSTRACT

An assembly which comprises a heat-recoverable article which is adapted to join substrates together and a plug which is in a recess of the article. The plug comprises a first polymer, e.g. nylon, which is opaque at room temperature and transparent at an elevated temperature, and preferably comprises a colored portion beneath the first polymer. When the article is connected to a power supply, it heats and recovers. At the recovery temperature of the substrate, the nylon melts and the colored portion becomes visible, thus indicating to an operator that the article should be disconnected from the power supply.

15 Claims, 1 Drawing Figure

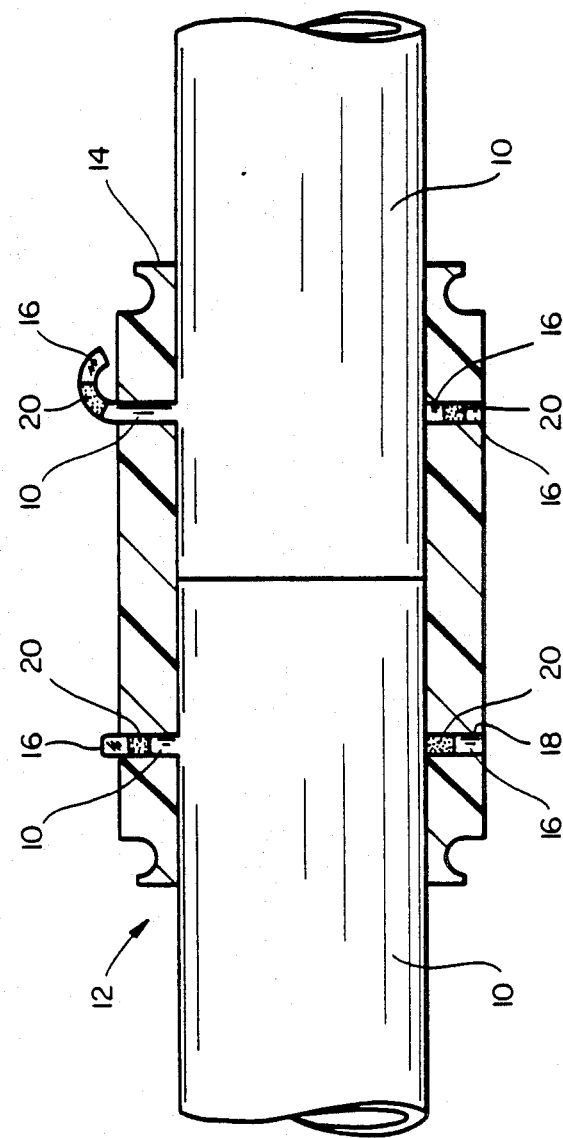

TEMPERATURE INDICATION ASSEMBLY FOR USE WITH HEAT-RECOVERABLE ARTICLES

CROSS-REFERENCE TO RELATED APPLICATIONS

This application is related to application Ser. No. 596,761 filed Apr. 4, 1984, by Nachum Rosenzweig (MP0922-US1), to application Ser. No. 607,991 now U.S. Pat. No. 4,570,055 issued Feb. 11, 1985, filed May 7, 1984, by Corey McMills (MP0939-US1), and to application Ser. No. 634,241 which is being filed contemporaneously with this application by Rosenzweig (MP0950-US1) now U.S. Pat. No. 4,575,618 issued Mar. 11, 1986. The entire disclosure of each of these applications is incorporated by reference herein. Each of these applications is copending and commonly assigned.

BACKGROUND OF THE INVENTION

1. Field of the Invention

This invention relates to a method for joining and repairing substrates in particular to an assembly comprising a heat-recoverable article and a temperature indicator.

2. Introduction to the Invention

Many methods are known for joining, repairing and reinforcing pipes and other substrates, including methods which make use of heat-recoverable articles comprising conductive polymers, which, when powered, supply the heat needed to cause recovery of the article. Reference may be made for example to U.S. Pat. Nos. 4,085,286, 4,177,446, and 4,421,582 and U.K. Pat. No. 1,265,194, the disclosure of which are incorporated by reference.

SUMMARY OF THE INVENTION

I have now discovered that substantial improvements and advantages can be provided in the performance and operation of a heat-recoverable article by providing an assembly comprising:
(a) a heat-recoverable article which can be connected to a power supply to cause current to pass through the article and to cause the article to heat and recover, and
(b) a plug which is in a recess in said recoverable article and comprises a first polymer that is opaque at room temperature and transparent at an elevated temperature.

The article preferably comprises a heat-recoverable element which is composed of a sintered conductive polymer composition comprising:
(a) a matrix consisting essentially of organic polymer particles which have been sintered together so that the particles have coalesced without losing their identity, and
(b) a particulate conductive filler which is dispensed in said matrix but is present substantially only at or near the boundaries of the coalesced particles.

In another aspect of the invention there is provided a method of repairing, reinforcing, joining or otherwise modifying a substrate, which method comprises
(1) placing adjacent the substrate an assembly comprising:
  (a) a heat-recoverable article which can be connected to a power supply to cause current to pass through the article and to cause the article to heat and recover, thereby joining the substrates together, and
  (b) a plug which is in a recess in said recoverable article and comprises a first polymer that is opaque at room temperature and transparent at an elevated temperature; and
(2) passing current through the article at least until the plug becomes transparent.

BRIEF DESCRIPTION OF THE DRAWING

The invention is illustrated in the accompanying drawing in which FIG. 1 is a schematic diagram of the assembly of the invention.

DETAILED DESCRIPTION OF THE INVENTION

Preferably the method of the invention makes use of a substrate which comprises polymeric pipes, but it may be also employed with metallic substrates. The following discussion, however, is referenced primarily to polymeric substrates.

As indicated above, the plug comprises a first polymer that is opaque at room temperature and transparent at an elevated temperature. The first polymer preferably has a low melt viscosity and a sharp melting temperature that is substantially higher than the melting point of at least one of the substrates. For example, the first polymer preferably has a melting point from 190° to 220° when at least one of the polymeric substrates has a melting point from 130° C. to 140° C. The first polymer preferably comprises nylon.

The plug preferably further comprises a colored portion beneath the first polymer, so that when the first polymer becomes transparent, the colored portion can be observed through the first polymer. The colored portion preferably comprises low density polyethylene containing a dye. The plug may comprise a top portion comprising a first polymer, a middle portion which is the colored portion and a bottom portion comprising a first polymer. Such a plug typically has a cylindrical shape and preferably has a radius from 0.1 to 1.0 cm and a length selected so that the plug is retained within the wall thickness of the article.

Attention is now directed to FIG. 1 which provides a schematic diagram of the invention. First and second sections of a polyethylene pipe 10 are joined by an assembly 12 that includes a heat-recoverable article 14 and a nylon plug 16 that is opaque at room temperature and transparent at an elevated temperature. The plug 16 is in a recess 18 in the article 14. The heat-recoverable article 14 is adapted to be connected to a DC or AC power supply (not shown) and current is passed through the article 14 at least until the plug 16 become transparent. If the plug 16 comprises a colored portion 20, current may be passed through the article 14 at least until the color portion 20 becomes visible. Alternatively, current may be passed through the article 14 at least until the plug 16 has been partially extruded from the recess 18, since the extrusion of the plug 16 indicates that the fusion temperature of the polyethylene pipe 10 has been reached. Note that the assembly 12 provides reliable indication of the pipe 10 fusion temperature, un-influenced by external conditions, e.g. weather, and therefore indicates to an operator an optimal time to disconnect the article 14 from the power supply.

EXAMPLE

UHMWPE powder (Hostalen GUR-413, available from American Hoechst), 95 parts by volume, having a molecular weight of about 4.0 million and an average particle size of about 0.1 mm, and carbon black (Ketjen Black) EC, available from Akzo Chemie), 5 parts by volume, were thoroughly mixed together in a high speed blender. The mixture was used to fill a cylindrical mold having an annular cross-section (inner diameter 0.8 inch, outer diameter 1.2 inch). The mixture was compacted in the mold at room temperature for about 5 minutes, using a pressure of about 15,000 psi, and was then sintered in the mold at about 230° C. for about 60 minutes, using a very low pressure (2 psi or less). When sintering was complete, the sintered mixture was cooled in the mold to about 50° C., while maintaining it under a pressure of about 12,000 psi. The mold was then opened and the sintered product removed. The product was about 2 inch long.

The sintered product was cross-linked by irradiating it to a dosage of about 3 Mrad, and was then rendered heat-shrinkable by expanding it at 120° C. to an inner diameter of about 1.2 inch, using a conical mandrel.

Two circular grooves were machined parallel to and about 0.3" from both edges of the cylindrical surface. The grooves were painted with a conductive paint and circular spirngs were inserted into the grooves so that the spring electrodes maintained good electrical contact with the conductive paint. The resistance of the product between the spring electrodes was about 3.8 ohms, the conductive polymer having a resistivity of about 3.0 ohm.cm.

A bore 0.106 inches in diameter was drilled through the coupler's thickness 0.3 inches axial distance from the closer groove. By means of a conical mandrel the bore diameter was expanded to 0.155 inches. A first cylindrical disc, having a 0.155 inches diameter and a thickness of about 0.080 inches, was inserted into the expanded bore so that is was flush with the inside surface of the coupler. Above it, a second disc, 0.155 inches in diameter and 0.020 inches thick, was inserted. On top of the second disc, and about 0.010 inches below the external surface of the coupler, a third disc, having the same dimension as the first disc, was inserted. The first and the third disks were made of a nylon 11 resin, available from Rilsan Corporation. The parallel surfaces of the third and the first disc were abraded by means of a fine abrasive paper so that the disks became even more opaque. The second disc was made from a yellow dye/-polyethylene master batch blend. The three discs were pressure fitted into the bore and stacked upon each other to fill the bore.

The sintered product was used to couple together two polyethylene pipes having an outer diameter of about 0.84 inch and a wall thickness of about 0.11 inch. The ends of the pipes were placed within the coupler, the pipe ends being butted together at the center of the coupler. The spring electrodes were connected to a 24 volt DC power supply by means of metal plates which were spring-loaded in the axial direction. The coupler heated up and when it reached its shrinkage temperature (after about 30–45 seconds) it shrank into contact with the pipes. The spring electrode maintained electrical contact with the coupler as it shrank.

The surface temperature of the coupler was monitored by means of an infrared thermometer with a 0.012 inches target size. When the surface temperature of the coupler reached about 200 centrigrade, the upper nylon disc started to melt and become clear so that the yellow dye was highly visible through it. About 15 seconds later the nylon discs started to extrude out of the bore, at which the point the electrical power was turned off. About 1 minute after the power was turned off, polyethylene melt coming from the coupled pipes started to emerge from the bore to indicate good fusion of the pipes' surfaces.

After cooling, the coupled pipes were tested according to the ASTM tensile-pull out and short term bursting tests. The coupled pipes met the test requirements, i.e., failure occurred always in the pipe, far enough away from the coupler.

After testing the three disc Indicator was cut open, parallel to its axis of symmetry. The bore was filled with polyethylene.

We claim:

1. A method of repairing, reinforcing, joining or otherwise modifying a substrate, which method comprises
   (1) placing adjacent the substrate an assembly comprising:
      (a) a heat-recoverable article which can be connected to a power supply to cause current to pass through the article and to cause the article to heat and recover, and
      (b) a plug which is in a recess in said recoverable article and comprises a first polymer, the plug being relatively opaque at room temperature and relatively transparent at an elevated temperature; and
   (2) passing current through the article at least until the plug becomes relatively transparent;
   thereby indicating that the parts of the recoverable article defining the recess have reached said elevated temperature.

2. A method according to claim 1, wherein the article comprises a heat-recoverable element which is composed of a sintered conductive polymer composition comprising:
   (a) a matrix consisting essentially of organic polymer particles which have been sintered together so that the particles have coalesced without losing their identity, and
   (b) a particulate conductive filler which is dispensed in said matrix but is present substantially only at or near the boundaries of the coalesced particles.

3. A method according to claim 1, wherein the first polymer has a melting point substantially higher than the melting point of at least one of said substrates.

4. A method according to claim 1, wherein the first polymer has a sharp melting temperature and a relatively low melt viscosity.

5. A method according to claim 1, wherein the first polymer has a melting point from 190° C. to 220° C. and at least one of the substrates has a melting point from 130° C. to 140° C.

6. A method according to claim 1, wherein the first polymer comprises nylon.

7. A method according to claim 1, wherein the plug comprises a colored portion beneath the first polymer, so that when the first polymer becomes transparent, the colored portion can be observed through the first polymer.

8. A method according to claim 7, wherein the colored portion comprises low density polyethylene containing a dye.

9. A method according to claim 7, wherein the plug comprises a top portion comprising a first polymer, a middle portion which is the colored portion and a bottom portion comprising a first polymer.

10. A method according to claim 1, wherein the plug has a cylindrical shape and has a radius from 0.1 cm to 1.0 cm.

11. A method according to claim 1, wherein the current is passed through the article at least until the plug has been partially extruded from the recess.

12. A method of repairing, reinforcing, joining or otherwise modifying a substrate, which method comprises
(1) placing adjacent the substrate an assembly comprising
   (a) a heat-recoverable article which can be connected to a power supply to cause current to pass through the article and to cause the article to heat and recover, the article comprising a heat-recoverable element which is composed of a sintered conductive polymer composition comprising:
      (i) a matrix consisting essentially of organic polymer particles which have been sintered together so that the particles have coalesced without losing their identity, and
      (ii) a particulate conductive filler which is dispersed in said matrix but is present substantially only at or near the boundaries of the coalesced particles; and
   (b) a plug which is in a recess in the article and comprises
      (i) an exposed outer portion which is relatively opaque at room temperature and relatively transparent at an elevated temperature, and
      (ii) an inner portion which is covered by the outer portion and which is colored;
(2) passing current through the article at least until the colored portion becomes visible;
thereby indicating that the parts of the recoverable article defining the recess have reached said elevated temperature.

13. A method according to claim 1 wherein two polyethylene pipes are joined together by recovery of the heat-recoverable article.

14. A method according to claim 11 wherein two polyethylene pipes are joined together by recovery of the heat-recoverable article, and said partial extrusion of the plug from the recess indicates that the fusion temperature of the polyethylene pipe has been reached.

15. A method according to claim 12 wherein two polyethylene pipes are joined together by recovery of the heat-recoverable article.

* * * * *